Figure 1:
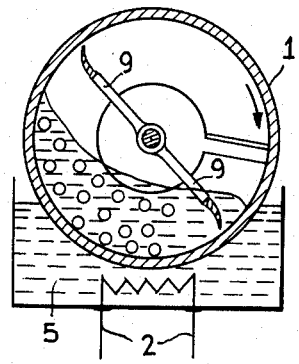

Nov. 30, 1965    D. BACHMANN ETAL    3,220,804
APPARATUS FOR THE CONTINUOUS MANUFACTURE
OF POLYCONDENSATION PRODUCTS
Filed Dec. 12, 1961    2 Sheets-Sheet 1

INVENTORS
DITMAR BACHMANN
HEINZ STEINRÖTTER
EMMERICH PÁSZTHORY
HANS HOYER
BY
Curtis, Morris & Safford
ATTORNEYS

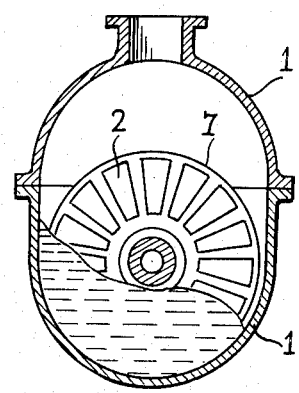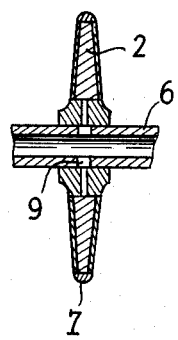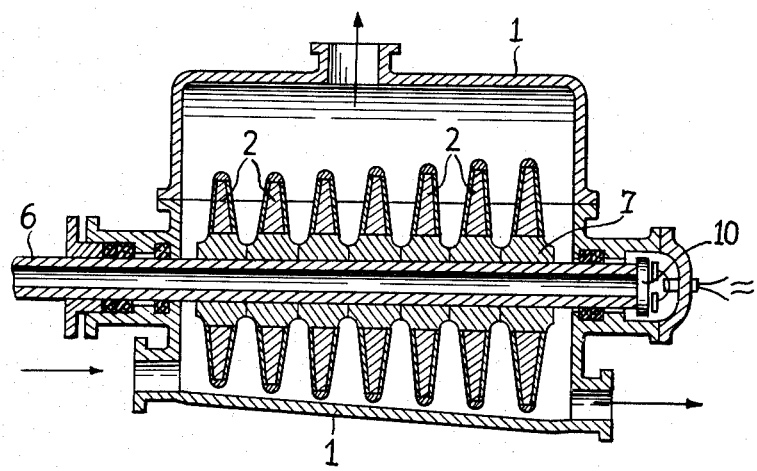

United States Patent Office

3,220,804
Patented Nov. 30, 1965

3,220,804
APPARATUS FOR THE CONTINUOUS MANUFACTURE OF POLYCONDENSATION PRODUCTS
Ditmar Bachmann, Hofheim, Taunus, Heinz Steinrötter, Eppstein, Taunus, and Emmerich Pászthory and Hans Hoyer, Frankfurt am Main, Germany, assignors to Farbwerke Hoechst Aktiengesellschaft vormals Meister Lucius & Brüning, Frankfurt am Main, Germany, a corporation of Germany
Filed Dec. 12, 1961, Ser. No. 158,816
Claims priority, application Germany, Dec. 16, 1960, F 32,776; Feb. 3, 1961, F 33,120
4 Claims. (Cl. 23—286)

The present invention relates to an apparatus for the continuous manufacture of polycondensation products, particularly of saturated linear and unsaturated polyesters, polyethers and polyamides.

It is known that the heat necessary for starting and continuing a polycondensation can be supplied to a reaction mixture with the help of a stationay wall. For example, the heat necessary for polycondensing a reactive mixture of a polyhydric alcohol and a dicarboxylic acid may be supplied through the wall of the container in which the mixture is placed.

It is furthermore known to expose a reactive mixture of the aforesaid kind to mechanical forces in order to mix it. For this purpose, the contents of the container are, for example, stirred. Containers provided with stirrer and necessary means and having a capacity of up to 5 to 10 m.$^3$ are used for polycondensation in batches.

Polycondensation in batches is beset, however, with difficulties owing to the thermal and rheological properties of the reaction mixture or melt. The poor thermal conductivity of the melt and the viscosity which increases as the polycondensation proceeds interfere with a uniform heating of the mixture and lead to products of a non-uniform degree of condensation.

The aforesaid thermal and rheological properties interfere also with the known continuous processes. The flowability which decreases as the condensation proceeds permits only low degrees of condensation in the columns. In apparatus that are similar to extruders and provided with, for example, a heated trough and pairs of rotating discs for moving the mixture, the poor thermal conductivity in combination with the high viscosity easily causes local overheating and thus partial overpolycondensation and undesired side reactions.

It has also been proposed to use so-called intensive processes, for example polycondensation in a thin layer, and to use film evaporators for this purpose. Such processes can, in principle, be realized; it is, however, difficult with thin layers to maintain a uniform thickness or uniform time of stay, whereby it is immaterial whether the material is passed along the heating surfaces in free flow or whether rotors are used. The aforesaid disadvantages are, therefore, even more pronounced in these processes.

All these known processes use apparatus with stationary heating surfaces. As far as the melt is mixed and transported by mechanical forces, directly driven means are exclusively used, for example stirrers, strippers, discs or blades. Owing to the properties of the melt, the boundary layers adhere toughly to the heating surfaces and cannot be removed in a satisfactory manner by the aforesaid means. The boundary layers are, therefore, in a constant danger of being overheated or overpolycondensed at the temperatures and with the quantities of heat necessary for rendering the process economical.

The present invention provides an apparatus which enables the aforesaid disadvantages to be avoided in a polycondensation.

The apparatus of the invention is illustrated diagrammatically by way of example in the accompanying drawings.

Figure 2:
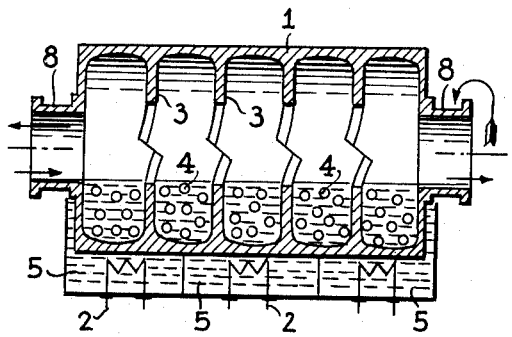
Figure 3:
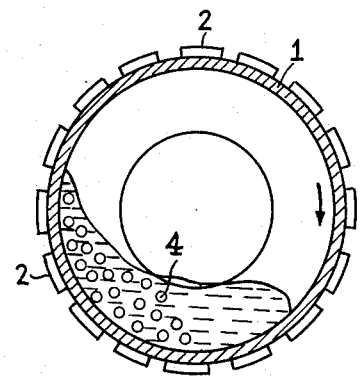
Figure 4:
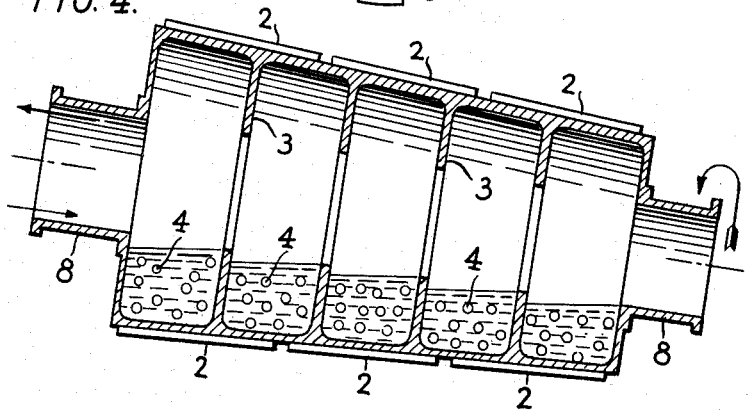

FIGS. 1, 3 and 5 of the drawings are cross-sectional elevations and FIGS. 2, 4 and 7 are longitudinal sections of the apparatus of the invention. FIG. 6 is a cross-sectional view of a stirring means of the apparatus.

The apparatus of the invention for the continuous manufacture of polycondensation products comprises a vacuum case 1 for the melt and a means for mixing the melt, at least one of these parts being rotatably mounted. Case 1 contains a means for indirectly heating the melt through the wall of the rotary part of the apparatus. Said means for indirectly heating the melt consists of several heating elements 2 which are independent of one another and disposed at the wall of the rotary part of the apparatus. The heating elements 2 can be operated only in that range of the wall which is below the surface of the melt. That portion of the rotary part of the apparatus which is above the surface of the melt is not heated.

This arrangement of the heating elements prevents overheating of the film of the melt which adheres to the portion of the rotary part of the apparatus which is above the surface of the melt. In this manner, formation of undesired by-products is substantially avoided. The rotary part of the apparatus (i.e., the case or a mixing means disposed therein) serves simultaneously for the conveyance of mechanical forces having components which counteract the gravitational field and which can be used for mixing and transporting the melt if the wall of this rotary part of the apparatus is of an appropriate shape.

In FIGS. 1 to 4 of the accompanying drawings, the vacuum case 1 is rotatably mounted and subdivided into several chambers by partition walls 3. Case 1 has the conical or cylindrical shape of a rotatably mounted tube and rests on hollow necks 8. The latter serve for the introduction of the reaction mixture or melt and for the withdrawal of the poly-condensation product. The vapors evolved may also be drawn off through one of these necks. Mixing is brought about by loose balls 4 disposed between the partition walls. Partition walls 3 assist in the mixing and prevent the balls 4 from running in one direction.

The heating means of the apparatus according to FIGS. 3 and 4 consists of several electrical heating elements 2 which are independent of one another and secured to, and uniformly distributed over, the wall of the rotatably mounted tube. With the help of a known switching arrangement (not shown) elements 2 are connected in a manner such that they can be operated only in the turning range below the surface of the melt. The elements that are in the turning range above the surface of the melt are not charged with current.

Alternatively, as shown in FIGS. 1 and 2, the heating means may consist of a salt or oil bath which is subdivided into several chambers 5 and of which the surface of liquid is below the surface of the melt. This arrangement may be used if the temperature range in which the polycondensation has to be carried out is favorable with respect to the fusion temperature of the heating bath or if no electric current is available for heating. Also in this arrangement, the heating elements 2 are operated independently of one another. The temperature of the bath in the individual chambers 5 can easily be adapted to the proceeding polycondensation by adjusting the amount or velocity of heating medium. Also in this case, heating is effective only in the range below the surface of the melt since drum 1 or tube 1 dips into the bath only to such an extent that the inner side of the immersed portion of the wall is aways completely covered with a thick layer of melt.

In a particularly simple construction of the apparatus of the invention, the stirring means comprises one or more hollow stirring members which are secured to a shaft and the inner wall of which is provided with heating elements which can be switched off in the turning range above the surface of the melt. The heat is transferred to the melt by the wall of the rotatably mounted stirring means. The case is stationary. This mode of construction of which FIG. 5 of the drawings is a cross-sectional view and FIG. 7 a longitudinal elevation, is not only simple from the view point of construction but offers all the advantages of an arrangement of large effective heating surfaces in a small space. For example, owing to the large size of the heating surface the through-put capacity of the apparatus can be increased or relatively small temperature differences with respect to the temperature of the melt may be used. Drying can be carried out under still milder conditions and the simultaneous transfer of mechanical forces for mixing and transporting the melt is increased.

In FIGS. 5 and 7, only one shaft 6 is disposed. It is, however, also possible to use several shafts. Shafts 6, forming part of the stirring means, carry discs 7 which are secured, for example by wedges or keys. In the openings of discs 7, electrical heating elements 2 are disposed. The lead-out wires may be conducted through bore holes 9 (FIG. 6) of the hubs and shafts. At the end of the shaft or shafts, a drum controller 10 may be arranged which enables the heating elements rotating together with the discs to be switched off on leaving the melt.

If it is intended to reach a very high degree of polycondensation, it may be advantageous to disposed strippers of known type between the discs to prevent the formation of rotating lumps of product. In stirring devices with several shafts disposed one beside the other, the stirring discs may be staggered and intermeshing, the distance between the individual stirring discs being so small that the rotating discs clean themselves mutually.

Instead of plane discs, there may also be used blades or worms which are heated with the same means as those described above for the discs. The heating elements that are above the surface of the melt are switched off in the same manner as described above.

Towards the short outlet neck 8 of the case the melt becomes more and more viscous. Especially at high degrees of polycondensation, no defined surface of melt is formed at that position but the upper half of the stirring device generally remains free from thick layers of melt. It is therefore advantageous to adjust or arrange the contacts of drum controller 10 in such a manner that the heating elements of the last discs or blades, situated towards the outlet, are currentless in the upper half of the turning range.

To avoid losses of heat or undesired condensations, case 1 of the apparatus of FIGS. 2 and 4 may be provided with a heating hood of known type. In apparatus constructed according to FIGS. 5 and 7, insulating casings or heating jackets may be used for this purpose.

The following example serves to illustrate the invention but it is not intended to limit it thereto.

EXAMPLE

Terephthalic acid diglycol ester which had been obtained in known manner by subjecting ethylene glycol to ester interchange with dimethyl terephthalate, was polycondensed to obtain high molecular weight polyethylene terephthalate.

For this purpose, the melt which had been admixed with a zinc acetate catalysts was fed continuously to an apparatus constructed in accordance with the invention and having the shape of a rotatably mounted tube.

The folowing Table I indicates the dimensions of the moved wall.

Table I

| | |
|---|---|
| Length of drum _____ m__ | 1.5 |
| Diameter of drum _____ m__ | 0.4 |
| Number of drum sections _____ | 12 |
| Number of balls per section _____ | 3 |
| Diameter of balls _____ mm__ | 50 |
| Amount of liquid contained in the drum _____ l__ | 15 |

For heating the drum, a salt bath of several chambers was used. The wall of the drum dipped into the bath only to such an extent that the heated surface of the wall was always covered with a thick layer of the liquid contained in the drum.

The polycondensate obtained was substantially free from by-products. The viscosity depended on the mode of operation. Any possible impurities of polycondensate of low molecular weight originating from the ester interchange were of no consequence.

Table II indicates three modes of operation differing from one another in velocity of wall, charge and wall temperature. Table II does not, however, give any limit as to the possible throughput and the possible results.

Table II

| | I | II | III |
|---|---|---|---|
| Number of revolutions of the drum, r.p.m. | 12 | 16 | 20 |
| Amount of diglycol ester introduced, kg./hour | 10 | 15 | 20 |
| Temperature of melt running in, ° C | 255 | 255 | 255 |
| Viscosity of melt running in, poises | 10 | 10 | 10 |
| Temperature of bath (inlet), ° C | 275 | 285 | 295 |
| Working pressure, mm. of mercury | 1 | 1.5 | 2.5 |
| Temperature of bath (outlet), ° C | 295 | 305 | 315 |
| Time of stay, minutes | 80 | 55 | 35 |
| Viscosity of polycondensate, poises | 500 | 650 | 850 |

The apparatus of the invention and the modifications described in the foregoing can be adapted to the polycondensation of known starting materials of various kinds by adjusting the velocity, temperature and dimensions of the wall and the charge. The apparatus of the invention and the modifications thereof can be used with particular advantage for all polycondensations in which split products or byproducts of relatively low boiling point are formed, as is the case in the preceding Example. The apparatus of the invention and its modifications may also be used without difficulty for copolycondensations.

We claim:

1. A device for the continuous manufacture of polycondensation products comprising a rotatably mounted tubular vacuum case having an inlet and an outlet at opposite ends to contain the reaction mixture melt, a plurality of annular partition walls within said case, the outer peripheries of said walls being in contact with said case, a plurality of loose balls within said case between said walls for mixing said melt, a plurality of liquid containers adjacent the underside of said case, said case partially extending into said containers, whereby said case is immersed in liquid within said containers to a depth approximately equal to the level of the melt within said case, and independent means for heating liquid within said containers to different temperatures, whereby heat is provided to said melt indirectly through the wall of said case substantially in the range thereof below the level of the melt.

2. A device for the continuous manufacture of polycondensation products comprising a vacuum case having an inlet and an outlet to contain the reaction mixture melt, a shaft within said case, a plurality of rotatable mixing members on said shaft for mixing said melt, electrical heating means independently operable within each of said mixing members in contact therewith, and means for actuating said heating means when the portion of said mixing members in contact with each of said heating means is below the level of said melt, whereby heat is provided to said melt indirectly through the walls of said mixing members substantially in the range thereof below the level of the melt.

3. A device according to claim 2 wherein said shaft is rotatably mounted and said mixing members are hollow disks secured to said shaft.

4. A device according to claim 2 wherein said shaft is rotatably mounted and said mixing members are blades secured to said shaft.

References Cited by the Examiner
UNITED STATES PATENTS

| | | | |
|---|---|---|---|
| 640,283 | 1/1900 | Hatch | 13—21 |
| 706,334 | 8/1902 | Moore | 23—269 |
| 1,004,509 | 9/1911 | Washburn | 13—22 X |
| 1,118,775 | 11/1914 | Hyde | 241—153 X |
| 1,593,879 | 7/1923 | Naugle | 13—21 X |
| 1,834,693 | 12/1931 | Frischer | 23—286 |
| 1,862,557 | 6/1932 | Wendler | 23—286 |

MORRIS O. WOLK, *Primary Examiner.*

JAMES H. TAYMAN, Jr., *Examiner.*